Nov. 21, 1967  S. J. BROLIN  3,354,448

HIGH SENSITIVITY VOLTAGE MONITOR

Filed Dec. 22, 1964

INVENTOR
S. J. BROLIN
BY
*John P. McDonnell*
ATTORNEY

United States Patent Office 3,354,448
Patented Nov. 21, 1967

3,354,448
HIGH SENSITIVITY VOLTAGE MONITOR
Stephen J. Brolin, Bronx, N.Y., assignor to Bell Telephone Laboratories, Incorporated, New York, N.Y., a corporation of New York
Filed Dec. 22, 1964, Ser. No. 420,325
5 Claims. (Cl. 340—248)

ABSTRACT OF THE DISCLOSURE

A simple, high-gain, voltage monitoring circuit wherein a low voltage condition causes the low voltage detecting and amplifying transistors to bring in an alarm. A high voltage condition causes the high voltage detecting transistor to reduce the bias supplied to the low voltage detecting transistor and again bring in the alarm.

---

Figure 1:
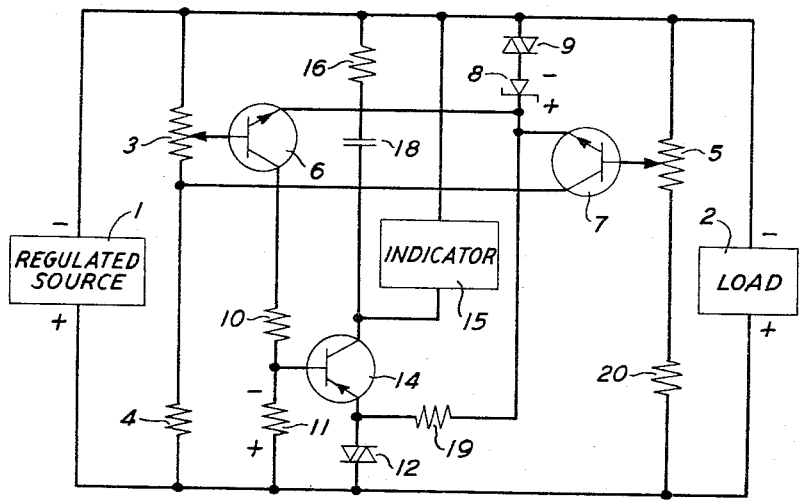

This invention relates to voltage monitoring circuits and more particularly to high sensitivity voltage monitoring and alarm circuits.

The voltage monitoring circuits of the prior art vary from mechanical arrangements using relays to relatively complex solid state circuitry. The mechanical arrangements generally employ a large number of marginal type relays which have an initially high cost and are expensive to maintain. Since the sensitivity, i.e., the accuracy with which the circuit indicates a monitored voltage above or below a predetermined value, of these mechanical circuits is usually no greater than that of comparable solid state circuitry, these latter circuits, which are less expensive to construct and maintain, are generally preferred.

Solid state monitoring circuits, however, also have many disadvantages. Generally, the voltage detecting or monitoring transistors exhibit a large amount of base-collector current leakage which reduces the sensitivity with which an excursion of the monitored voltage outside a predetermined range can be detected. Although silicon n-p-n transistors with only relatively small base-collector leakage currents are readily available commercially, silicon p-n-p transistors with the same low leakage currents do not have the same ready commercial availability. Since the prior art usually employs transistors of opposite conductivity types in voltage monitoring circuits to facilitate the use of a single voltage excursion indicator, such as an alarm, the sensitivity of these circuits is relatively poor.

The voltage monitoring circuits of the prior art also required several biasing sources to establish desired operating levels for the voltage detecting transistors therein. Since for many monitoring circuit applications only the voltage to be monitored is available to supply the biasing potentials to the voltage detecting transistors, this multiple biasing source requirement severely limits the applicability of these monitoring circuits and diminishes their fail-safe ability, i.e., their ability to provide an indicaton of a total loss of monitored voltage or a trouble condition within the monitor itself. Although solid state circuits using a single source of potential and having predetermined switching limits, such as Schmitt trigger circuits, are known to the art, the inherent wide switching threshold variations (hysteresis) in such circuits limit their sensitivity, and hence applicability, for most voltage monitoring applications.

It is, therefore, an object of this invention to provide a solid state voltage monitor circuit with a high degree of sensitivity that does not require additional biasing sources.

In accordance with a feature of this invention, the high voltage detecting transistor is connected to the biasing network of the low voltage detecting transistor which is in turn connected to an abnormal voltage indicator that registers monitored voltage excursions outside a predetermined normal voltage range in response to the state of conduction of the low voltage detecting transistor. A monitored voltage excursion above the upper predetermined limit of the normal voltage range will initiate conduction through the high voltage detecting transistor and reduce the bias supplied to the low voltage detecting transistor to render this transistor nonconductive and provide an abnormal voltage indication or registration. A monitored voltage excursion below the lower predetermined limit of the normal voltage range will also cause the low voltage detecting transistor to become nonconductive and cause an abnormal voltage registration. This novel interaction of the detecting transistors permits the circuit to perform the monitoring function using only the potential being monitored as a biasing source, without the prior art necessity of additional biasing potential sources. As an added advantage, the interaction of the detecting transistors facilitates the use of individual low leakage n-p-n silicon transistors, which are readily available commercially, as both the high and low voltage detecting devices. The failsafe and sensitivity characteristics of the monitor are thus greatly improved over the characteristics of the monitoring circuits of the prior art.

Other objects and features of the present invention will become apparent upon consideration of the following detailed description when taken in connection with the accompanying drawing, in which:

FIG. 1 is a schematic diagram of an embodiment of the invention; and

Figure 2:
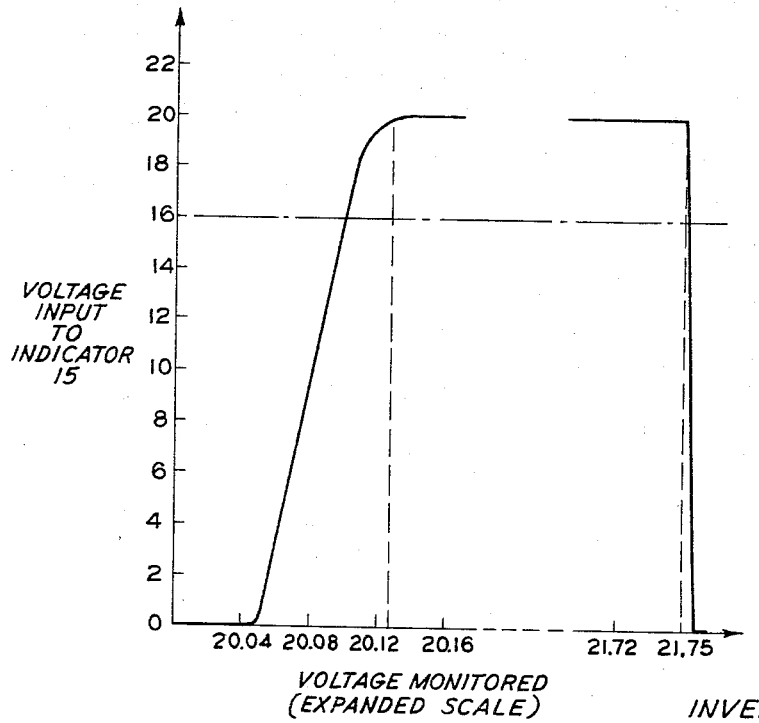

FIG. 2 graphically illustrates the superior sensitivity advantages of the present invention.

As can be seen from FIG. 1 of the drawing, a regulated source 1 is serially connected to supply a load 2, the voltage across which it is desired to monitor. The low voltage sensing potentiometer 3 is serially connected with a resistor 4 across the load 2 to be responsive to the voltage to be monitored. A second potentiometer 5 is generally connected with current limiting resistor 20 across the load 2 to also be responsive to the voltage being monitored. The low voltage detecting silicon n-p-n transistor 6 has its base electrode connected to the wiper arm of the potentiometer 3. The emitter electrode of transistor 6 is connected to the emitter electrode of high voltage detecting n-p-n transistor 7. Zener diode 8 is serially connected, in the Zener direction, with varistor 9 from the common emitter connection of transistors 6 and 7 to the common negative terminal of the source 1 and the load 2. The collector electrode of transistor 7 is connected to the juncture of potentiometer 3 and resistor 4 to provide the interaction noted heretofore, as discussed in detail hereinafter. Resistors 10 and 11 are serially connected from the collector electrode of transistor 6 to the common positive terminal of the source 1 and load 2. Varistor 12 is connected between the emitter electrode of amplifying transistor 14 and the common positive terminal of the source 1 and load 2. The base electrode of p-n-p amplifying transistor 14 is connected to the juncture of resistors 10 and 11. The collector electrode of amplifying transistor 14 is connected to supply current to the indicator 15, which may be any conventional indicating or registrating network such as, for example, a normally operated relay with a battery and bell connected to the break contacts thereof. Indicator 15 is also connected to the common negative terminal of the source 1 and load 2. Resistor 16 and capacitor 18 are serially connected from the common negative terminal of the source 1 and load 2 to the collector electrode of amplifying transistor 14. Resistor 19 is connected from the common emitter connection of transistors 6 and 7 to the emitter electrode of transistor 14. Resistor 20 limits the current through potentiometer 5 at the extreme settings of this potentiometer.

The operation of the voltage monitoring circuit of FIG. 1 can best be understood by first discussing the usual condition of the monitoring circuit during which the monitored voltage is in the normal range above (more negative with respect to the common positive terminal) a first, but below (less negative with respect to the common positive terminal) a second, predetermined magnitude or limit. The base electrode of transistor 6 is connected to the wiper arm of potentiometer 3 to sample a preset portion of the voltage to be monitored. The sampled voltage is compared with the reference potential of the network comprising Zener diode 8 and varistor 9, the potential across which remains constant, with respect to the emitter-base potentials of transistors 6 and 7, over a relatively wide temperature range. Resistor 19 both insures that Zener diode 8 is continuously conducting in the inverse direction for most monitored voltage magnitudes other than an essentially complete loss of load potential and, additionally, provides a bias current for varistors 9 and 12. The wiper arm of potentiometer 3 is preadjusted for a particular application so that transistor 6 will normally be conductive for voltages above a predetermined minimum value. If the voltage being monitored falls below this minimum value then the reference bias across Zener diode 8 and varistor 9 causes low voltage detecting transistor 6 to become nonconductive and in turn terminate the conduction through amplifying transistor 14.

The base-emitter path of amplifying transistor 14 is serially connected with varistor 12 and resistor 11, the latter of which is serially connected in the collector-emitter path of low voltage detecting transistor 6. Varistor 12 provides a reverse bias, notably at high environment temperatures, to help bias transistor 14 out of conduction to cause an abnormal monitored voltage indication, as discussed hereinafter. If the voltage being monitored is above the preset minimum value or low range limit, transistor 6 will be conductive and current will flow from the positive terminal of the source 1 through resistor 11, current limiting resistor 10, the collector-emitter path of transistor 6, Zener diode 8, and varistor 9, back to the negative terminal of the regulated source 1. The current flow through resistor 11 causes a potential drop thereacross, of the polarity indicated on the drawing, sufficient to bias inexpensive amplifying transistor 14, which need not have the same low leakage currents as the detecting transistors, into conduction. Conduction through transistor 14 causes current to flow into the indicator 15, which should, therefore, be of a type responsive to the absence of a current input to indicate or register an abnormal condition, which in the present case, will be a high or low monitored voltage excursion. As noted heretofore, for example, the indicator 15 may be any conventional indicating or registering circuitry such as a normally operated relay with a battery and bell serially connected to break contacts thereof such that the bell is activated only in the absence of current through the normally operated relay.

If, therefore, the voltage being monitored or the voltage across the load 2 should drop (i.e., a monitored voltage excursion wherein the load voltage is less negative with respect to the positive terminal) so that the magnitude of the predetermined portion of the voltage appearing across potentiometer 3 is less than the magnitude of the constant reference voltage across Zener diode 8 and varistor 9, transistor 6 will cease to conduct and current will no longer flow through the collector-emitter path of transistor 6 and resistor 11. Since there is no longer any voltage drop across resistor 11, transistor 14 will also cease to conduct, there will be no current input to the indicator 15, and an abnormal voltage condition will be registered. Once the abnormal condition or excursion is terminated, the monitoring circuit will again automatically resume normal operation. If desired for a particular application, however, a self-locking indicator circuit, such as a locking relay, could be used to prevent resumption of the normal monitoring operation. In such an application, reset circuitry, such as a pushbutton, could be connected across resistor 11 to release the indicator and restart the monitor. It should be apparent, of course, that the indicator 15 could also include a counting circuit which counted the number of times the current therethrough was terminated for applications where such an indication might be desired.

Potentiometer 5 is normally preset, for a particular monitoring application, so that the voltage appearing between the base and emitter electrodes of transistor 7 is insufficient to bias this transistor into conduction. In the normal voltage range, therefore transistor 6 will be conductive while transistor 7 is nonconductive. If, however, the voltage being monitored should rise (i.e., a monitored voltage excursion wherein the load voltage is more negative with respect to the positive terminal) so that the potential at the base electrode of transistor 7 is greater than the reference potential at the emitter electrode, then transistor 7 will be biased into conduction. As soon as transistor 7 becomes conductive, current will flow from the positive terminal of the source 1 through resistor 4, the collector-emitter path of transistor 7, Zener diode 8, and varistor 9, back to the negative terminal of the source 1. Since the path comprising the collector-emitter path of transistor 7, Zener diode 8, and varistor 9 presents a second current path for the current leaving resistor 4, the current through, and hence the voltage across, potentiometer 3 immediately drops, and transistor 6 ceases to conduct upon conduction through the collector-emitter path of transistor 7. As discussed heretofore in connection with the low voltage condition, termination of conduction through the collector-emitter path of transistor 6 also causes transistor 14 to be nonconductive, removes the current input to indicator 15, and causes an abnormal voltage registration. An abnormal voltage registration will, therefore, be provided for either a high or a low voltage excursion outside the predetermined normal range.

In summary, a monitored voltage excursion above the predetermined limit determined by the adjustment of potentiometer 5 will cause transistor 7 to be biased into conduction to remove the forward conductive bias from low voltage detecting transistor 6, which becomes nonconductive. Terminating the conduction through transistor 6 causes transistor 14 to become nonconductive and thus remove the current input from the indicator 15 to register a monitored voltage excursion. A monitored voltage excursion below the predetermined limit determined by the adjustment of potentiometer 3 will, however, directly terminate the conduction through transistors 6 and 14 to also cause an abnormal voltage registration. In the circuit characteristics illustrated by FIG. 2, for example, if the indicator 15 were responsive so as to provide an abnormal voltage registration when input current to the indicator fell to a level indicated by an indicator input voltage below 16 volts, then an abnormal voltage registration would be provided when the voltage being monitored fell below 20.10 volts and rose above 21.75 volts. Other adjustments of potentiometers 3 and 5 will, of course, vary the high and low voltage limits, as desired. It should be noted that the high and low voltage limits may be preset independently of each other.

Indicator 15 will normally be a simple and relatively inexpensive circuit. As noted heretofore, a normally operated relay with a battery and bell connected to the break contacts thereof would suffice for alarm applications. The response of such inexpensive circuitry to a reduction of input voltage or current will vary both from circuit to circuit and, in a particular circuit, with temperature variations. To provide a reliable indication of monitored voltage excursions, therefore, it is usually necessary to reduce the voltage or current input to the indicator from the normal level to a negligible value. For this reason, the sensitivity of a monitor is best measured in terms of indicator input voltage or current versus monitored voltage.

The superior sensitivity characteristics of the present invention can be easily seen from FIG. 2 of the drawing wherein the voltage input to the indicator 15 is plotted on the ordinate and the voltage being monitored is plotted, on an expanded scale, as the abscissa. In the left-hand characteristic of FIG. 2, which represents the low voltage response, the input voltage to the indicator 15 drops from approximately 20 volts to zero with only an .075 volt monitored voltage variation, i.e., the monitored voltage change below present magnitude necessary to cause the input indicator voltage to drop from 20 volts to zero. Since a reduction to zero in the input indicator voltage will only rarely be necessary to cause a loss of input current registration, however, the .075 volt figure, although surprisingly small, is somewhat misleading. It has been found experimentally that low voltage registrations will reliably be provided in the range between .030 and .040 volt below the predetermined lower monitored voltage limit.

As can be seen from the right-hand characteristic of FIG. 2, which represents the high voltage limit response, a monitored voltage change of only .01 volt above the preset high voltage magnitude will cause the indicator input voltage to drop from approximately 21 volts to zero to immediateily provide an abnormal voltage registration. The greater sensitivity exhibited by the high voltage characteristic is due ot the extra stage of gain obtained for a high voltage excursion which, as discussed, involves transistors 6, 7, and 14, while a low voltage excursion involves only transistors 6 and 14. It should be obvious, of course, that if a sensitivity greater than .040 volt were desired for a low voltage excursion, this could be obtained simply by inserting an extra amplifying stage between the collector electrode of transistor 14 and the indicator 15. On the other hand, it should be equally obvious that if a sensitive indicator 15 is used, or if less circuit sensitivity is required, then amplifier transistor 14 may be eliminated with the indicator 15 connected directly to the collector electrode of transistor 6.

The above described arrangement is illustrative of the principles of the invention. Other embodiments may be devised by those skilled in the art without departing from the spirit and scope of the invention.

What is claimed is:

1. A voltage monitoring circuit comprising first and second transistors each having base, collector, and emitter electrodes, first voltage sampling means for applying a first predetermined portion of the voltage to be monitored to the base electrode of said first transistor, second voltage sampling means for applying a second predetermined portion of the voltage to be monitored to the base electrode of said second transistor, a source of reference voltage, means connecting said source of reference voltage to the emitter electrodes of each of said first and second transistors, an indicator connected to the collector electrode of said first transistor to register an excursion of the voltage at the base electrode of said first transistor to a magnitude less than the magnitude of said reference voltage, and means connecting the colector electrode of said second transistor to the base electrode of said first transistor to cause the bias at the base electrode of said first transistor to be reduced when an excursion of the voltage being monitored increases the voltage at the base electrode of said second transistor to a magnitude greater than the magnitude of said reference voltage, whereby said indicating means registers an abnormal voltage condition whenever the magnitude of the first predetermined portion of the monitored voltage falls below the magnitude of the reference voltage or the magnitude of the second predetermined portion of the monitored voltage exceeds the magnitude of the reference voltage.

2. A voltage monitoring circuit comprising first and second transistors of like conductivity type each having base, collector, and emitter electrodes, a Zener diode, first and second potentiometers, a resistor, means serially connecting said first potentiometer and said resistor to sample the voltage to be monitored, means connecting said second potentiometer to sample the voltage to be monitored, means connecting the base electrode of said first transistor to the wiper arm of said first potentiometer, means connecting the base electrode of said second transistor to the wiper arm of said second potentiometer, means connecting said Zener diode to be responsive to the voltage to be monitored so that said Zener diode is continuously conducting in the Zener direction, means connecting said Zener diode to the emitter electrodes of each of said first and second transistors, an alarm, means connecting said alarm to the collector electrode of said first transistor, and means connecting the collector electrode of said second transistor to the juncture of said first potentiometer and said first resistor to cause said alarm to indicate current flow through the collector-emitter path of said second transistor.

3. A voltage monitoring circuit comprising first and second n-p-n transistors, a p-n-p transistor, each of said transistors having base, collector, and emitter electrodes, first and second potentiometers, first and second resistors, a Zener diode, means serially connecting said first potentiometer and said first resistor to be responsive to the voltage to be monitored, means connecting said second potentiometer to be responsive to the voltage to be monitored, means connecting the base electrodes of each of said first n-p-n transistors to the wiper arms of each of said first and second potentiometers respectively, means connecting said Zener diode across the voltage to be monitored so that said Zener diode is continuously conducting in the Zener direction, means connecting said Zener diode to the emitter electrodes of each of said first and second n-p-n transistors, means serially connecting said second resistor from the emitter electrode of said p-n-p transistor to the collector electrode of said first n-p-n transistor, means connecting the base electrode of said p-n-p transistor to the collector electrode of said first n-p-n transistor, means connecting said second resistor across the base-emitter electrode of said p-n-p transistor, an alarm, means connecting said alarm to the collector electrode of said p-n-p transistor, said means connecting the collector electrode of said second n-p-n transistor to the juncture of said first potentiometer and said first resistor.

4. A voltage monitoring circuit comprising first and second transistors each having their collector-emitter path connected across the voltage to be monitored and their base-emitter paths connected across at least individual portions of the voltage to be monitored, said first transistor being responsive to an excursion outside one limit of said monitored voltage range, said second transistor being responsive to an excursion outside the other limit of said monitored voltage range, an indicator connected to said first transistor to register signals from said first transistor and thereby indicate excursions outside said one limit of the monitored voltage range, and means connecting said second transistor to said first transistor to cause said first transistor to be responsive to a signal from said second transistor so that said indicator registers a monitored voltage excursion outside said other of said monitored range limits.

5. A voltage monitoring circuit comprising first and second transistors each having their collector-emitter paths connected across the voltage to be monitored and their base-emitter paths connected across at least individual portions of the voltage to be monitored to detect monitored voltage excursions outside a range having first and second predetermined limits, said first voltage detecting means being responsive to voltage excursions below said first predetermined limit, said second voltage detecting means being responsive to voltage excursions above said second predetermined limit, an indicator connected to said first transistor to register signals from said first transistor and thereby indicate excursions below said first predetermined limit of the monitored voltage range, and means connecting said second transistor to said first transistor to cause said first transistor to be responsive to a signal from said second transistor so that said indicator registers monitored voltage excursions above said second predetermined limit in addition to excursions below said first predetermined limit.

References Cited

UNITED STATES PATENTS 2,959,717  11/1960  Conger.
3,099,000  7/1963  Dunning _____ 340—248

OTHER REFERENCES

IBM Tech. Discl. Bul.: "Voltage Detection Circuit," vol. 3, No. 6, November 1960, p. 37.

IBM Tech. Discl. Bul.: "High-Low Limit Detector," vol. 7, No. 2, July 1964, p. 132.

THOMAS B. HABECKER, *Acting Primary Examiner.*

NEIL C. READ, *Examiner.*

D. MYER, *Assistant Examiner.*